A. D. ELZY.
CULINARY UTENSIL.
APPLICATION FILED MAR. 3, 1913.
1,134,376.
Patented Apr. 6, 1915.
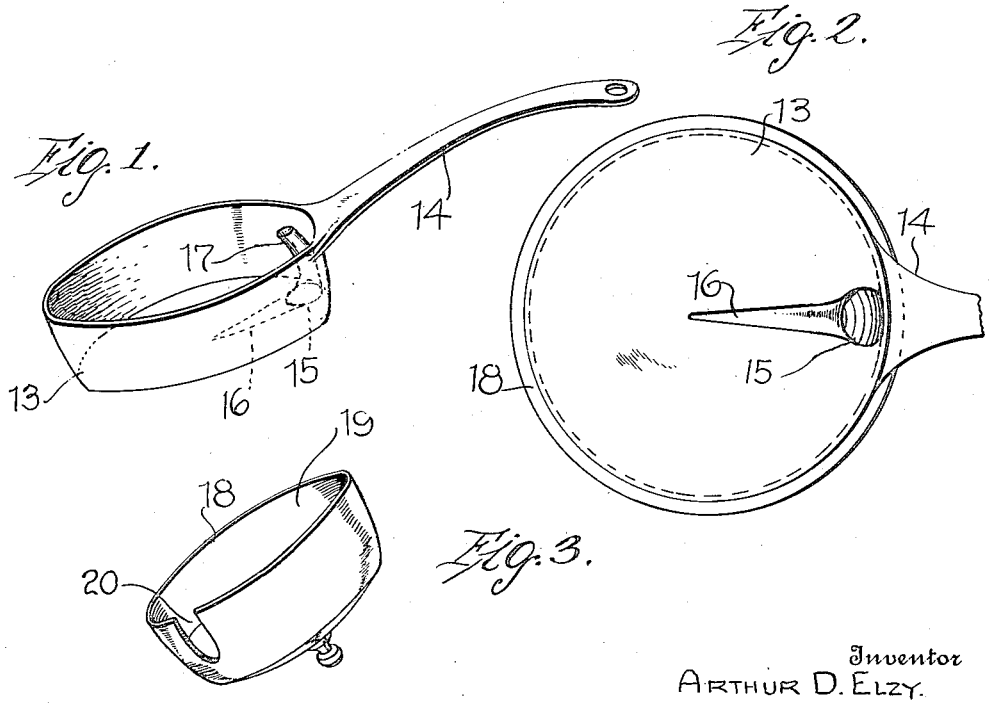
Inventor
ARTHUR D. ELZY.
Witnesses
Robert M. Sutphen.
A. J. Hud.
By Watson E. Coleman
Attorney

UNITED STATES PATENT OFFICE.

ARTHUR D. ELZY, OF LOUISVILLE, KENTUCKY.

CULINARY UTENSIL.

1,134,376.

Specification of Letters Patent. Patented Apr. 6, 1915.

Application filed March 3, 1913. Serial No. 751,899.

*To all whom it may concern:*

Be it known that I, ARTHUR DAVID ELZY, a citizen of the United States, residing at Louisville, in the county of Jefferson and State of Kentucky, have invented certain new and useful Improvements in Culinary Utensils, of which the following is a specification, reference being had to the accompanying drawings.

This invention relates to new and useful improvements in culinary utensils and my object is to provide a culinary utensil provided with means for preventing the odor from emanating therefrom.

A further object of the invention resides in providing means in connection with the utensil for causing a down draft to convey the vapors which are caused by the cooking in the utensil to the range upon which the device is mounted.

A further object of the invention resides in providing a utensil having an opening in the bottom thereof, which opening is surrounded by a tubular member or the like extending vertically within the receptacle, the latter being adapted to receive the vapors as the same rise from the articles to be cooked.

A still further object of the invention resides in providing a device which is extremely simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claim.

In the accompanying drawings forming a part of this application, Figure 1 is a perspective view of a frying pan showing my down draft attachment applied to use thereon. Fig. 2 is a bottom plan view of the same. Fig. 3 is a perspective view of the top or lid used in connection with the frying pan.

In the drawing I have shown one form of the invention, wherein a down draft attachment is applied to a frying pan 13. This pan is of the usual type having a handle 14 thereon and the bottom thereof is formed provided adjacent said handle member with an opening 15. Said bottom has the under face thereof also grooved radially, as shown at 16, said groove leading to the aforesaid opening 15. Surrounding the opening 15 and engaged with the side wall of the pan 13, is an inwardly curved tubular section 17, the upper end of which terminates in a plane just below the plane of the upper edge of said receptacle 13. A top 18 is also provided for this receptacle, the same being convexed and the depending flange 19 thereof, which flares somewhat outwardly toward its lower edge, has a cut-away portion 20 formed therein. This cut-away portion 20 in the flange 19 is provided for the purpose of introducing the edibles to be cooked within the pan without entirely removing the cover or lid. By simply pulling the lid upwardly to a slight extent, the upper end of the recess 20 may be exposed and the additional articles to be cooked introduced while little or none of the odor will escape from the pan. In addition the cut-away portion or recess 20 in the flange 19, is for the purpose of receiving the curved flange 17 which extends upwardly from the bottom wall of the pan. It will be appreciated that as the vapors and aroma rise from the frying articles, the same will be conducted through the tubular member 17 to the opening 15 in the bottom of said receptacle. These vapors will then be conducted through the medium of the groove 16 to the central portion of the bottom of said receptacle, where they will escape to the fire box of the range upon which the receptacle is mounted.

From the foregoing it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

A frying pan having an opening in its bottom in close proximity to the side flange thereof and having a radially disposed groove in the under surface of its bottom in communication with the opening, and having a curved tube within the opening formed with the bottom and side flange thereof and disposed about the opening, and having its upper edge terminating below the upper edge of the side flange, and a cover for such pan having a depending flange to fit within the side flange of the pan, the flange of the cover being provided with a recess to receive the curved tube disposed about the opening in the bottom of the pan.

In testimony whereof I hereunto affix my signature in the presence of two witnesses.

ARTHUR D. ELZY.

Witnesses:
ELIZABETH M. GRIEB,
AL B. DARRAGH.